(12) United States Patent
O'Neal

(10) Patent No.: US 6,286,252 B1
(45) Date of Patent: Sep. 11, 2001

(54) DELIVERY SYSTEM FOR HORTICULTURAL AGENTS

(76) Inventor: Daniel J. O'Neal, 264 Shadow View Dr., St. Louis, MO (US) 63021

( * ) Notice: Subject to any disclaimer, the term of this patent is extended or adjusted under 35 U.S.C. 154(b) by 0 days.

(21) Appl. No.: 09/424,723

(22) PCT Filed: May 29, 1998

(86) PCT No.: PCT/US98/11005

§ 371 Date: Nov. 30, 1999

§ 102(e) Date: Nov. 30, 1999

(87) PCT Pub. No.: WO98/53663

PCT Pub. Date: Dec. 3, 1998

(51) Int. Cl.⁷ .................................................. A01G 29/00
(52) U.S. Cl. ................................................................ 47/48.5
(58) Field of Search ................... 47/48.5, 56, 9; 162/224

(56) References Cited

U.S. PATENT DOCUMENTS

| | | |
|---|---|---|
| 1,372,995 | 3/1921 | Eckart . |
| 1,372,996 | 3/1921 | Eckart . |
| 1,372,997 | 3/1921 | Eckart . |
| 1,372,998 | 3/1921 | Eckart . |
| 1,372,999 | 3/1921 | Eckart . |
| 1,554,865 | 9/1925 | Magoon . |
| 1,870,110 | 8/1932 | Hall . |
| 1,880,136 | 9/1932 | Hickok . |
| 1,936,988 | 11/1933 | Otwell ..................................... 47/37 |
| 1,948,117 | 2/1934 | Kadow ..................................... 47/48 |
| 1,971,390 | 8/1934 | Yahres ..................................... 47/48 |
| 1,988,307 | 1/1935 | Fay ............................................. 47/1 |
| 2,023,270 | 12/1935 | Fischer ..................................... 47/1 |
| 2,032,608 | 3/1936 | Antrim ..................................... 47/1 |
| 2,067,589 | 1/1937 | Antrim ..................................... 47/1 |
| 2,091,993 | 9/1937 | Jones ....................................... 71/64 |
| 2,315,949 | * 4/1943 | Fischer ................................. 47/48.5 |

(List continued on next page.)

Primary Examiner—Charles T. Jordan
Assistant Examiner—Elizabeth Shaw
(74) Attorney, Agent, or Firm—Senniger, Powers, Leavitt & Roedel

(57) ABSTRACT

A delivery system for delivering a horticultural agent to a plant including a carrier adapted to be placed in proximity to a root system of a plant, the carrier being of a material which is biodegradable and dissolvable upon prolonged exposure to water, and the horticultural agent being adhered to or admixed with the carrier and being dissolvable upon prolonged exposure to water.

37 Claims, 7 Drawing Sheets

U.S. PATENT DOCUMENTS

| | | | |
|---|---|---|---|
| 2,380,721 | 7/1945 | Brigden | 47/1 |
| 2,648,165 | 8/1953 | Nestor | 47/56 |
| 2,747,768 | 5/1956 | Raines | 221/25 |
| 2,776,634 | 1/1957 | Morton | 111/92 |
| 2,812,618 | 11/1957 | Weston | 47/56 |
| 2,949,698 | 8/1960 | Downey et al. | 47/9 |
| 2,982,394 | 5/1961 | Novak | 206/46 |
| 3,005,287 | 10/1961 | Dudley | 47/25 |
| 3,043,709 | 7/1962 | Amborski | 117/7 |
| 3,057,713 * | 10/1962 | Gessler | 47/48.5 |
| 3,060,012 | 10/1962 | Pavek | 71/64 |
| 3,205,619 | 9/1965 | Henry | 47/9 |
| 3,220,727 | 11/1965 | Legan | 273/33 |
| 3,232,007 | 2/1966 | Boatwright | 47/48.5 |
| 3,252,250 | 5/1966 | Lemaire | 47/9 |
| 3,273,284 | 9/1966 | Anagnostou | 47/34 |
| 3,274,731 | 9/1966 | Vigneault et al. | 47/9 |
| 3,290,821 | 12/1966 | Parry | 47/48.5 |
| 3,320,695 | 5/1967 | Moore, Jr. | 47/9 |
| 3,384,993 | 5/1968 | Kane | 47/58 |
| 3,454,510 | 7/1969 | Newland et al. | 260/23 |
| 3,590,528 | 7/1971 | Shephard | 47/9 |
| 3,673,134 | 6/1972 | Anderson | 260/5 |
| 3,748,115 | 7/1973 | Sommer et al. | 71/64 |
| 3,755,962 | 9/1973 | Walters et al. | 47/34 |
| 3,821,863 | 7/1974 | Chan | 47/48.5 |
| 3,857,195 | 12/1974 | Johnson | 47/32 |
| 3,914,900 | 10/1975 | Bigelow et al. | 47/9 |
| 4,014,675 | 3/1977 | Osborn | 71/28 |
| 4,052,190 | 10/1977 | Berliner | 71/11 |
| 4,055,974 | 11/1977 | Jackson, Jr. | 71/11 |
| 4,474,595 | 10/1984 | Lawhon, Jr. et al. | 71/28 |
| 4,627,191 | 12/1986 | Bergere | 47/25 |
| 5,030,031 * | 7/1991 | Brown | 47/48.5 |
| 5,065,543 | 11/1991 | Brook | 47/25 |
| 5,165,351 | 11/1992 | Billings | 111/199 |
| 5,335,449 | 8/1994 | Beatty | 47/48.5 |
| 5,522,176 | 6/1996 | Suttle | 47/25 |
| 5,526,607 | 6/1996 | Roesch et al. | 47/66 |
| 5,585,150 | 12/1996 | Sheehan | 428/15 |
| 5,605,009 | 2/1997 | Elder | 47/25 |
| 5,618,387 | 4/1997 | Yeh et al. | 162/224 |
| 5,730,773 | 3/1998 | Farley | 71/64.11 |
| 5,942,021 * | 8/1999 | Stirrup | 47/48.5 |

* cited by examiner

FIG. 1
FIG. 2
FIG. 3
FIG. 4
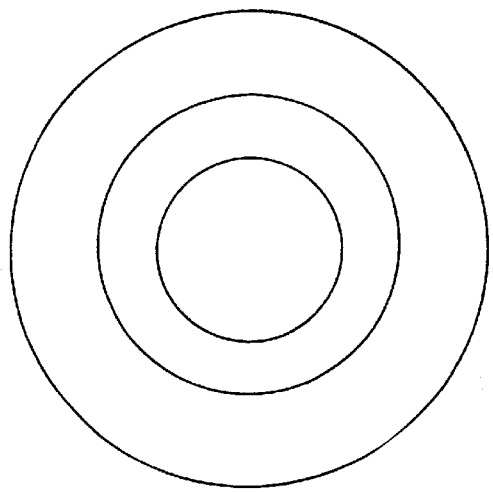
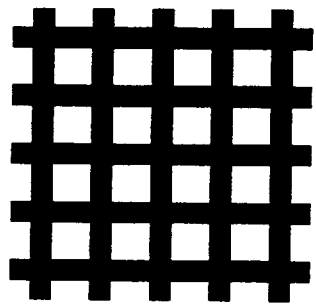
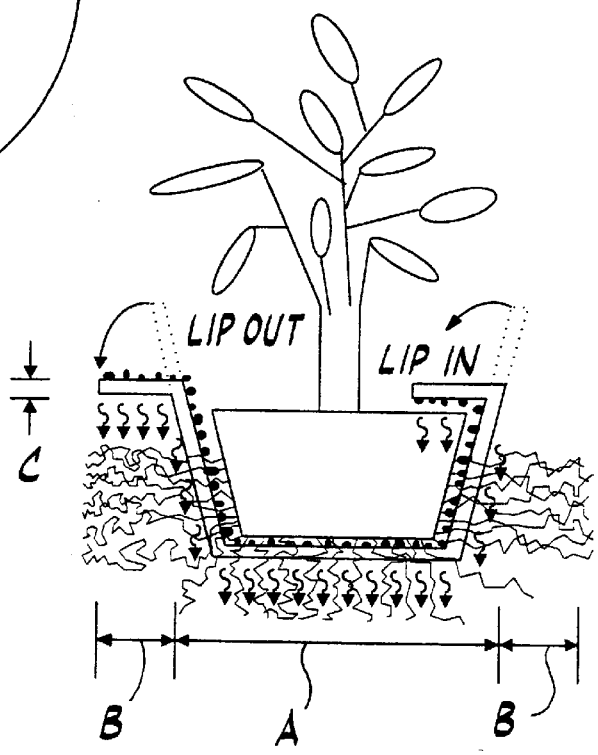
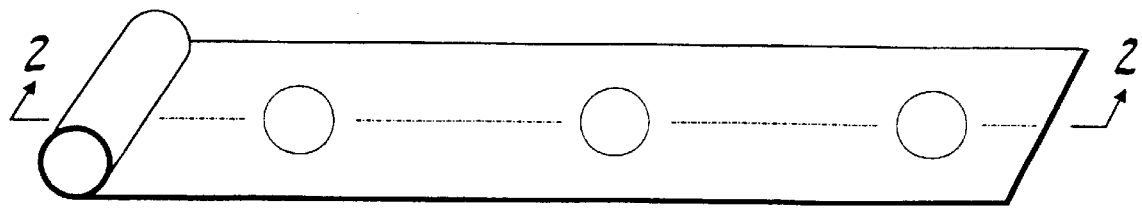

DELIVERY SYSTEM FOR HORTICULTURAL AGENTS

BACKGROUND OF THE INVENTION

This invention relates to a system that delivers horticultural agents including nutrients, fertilizers, insecticides, and herbicides to a plant's root system effectively and efficiently. This invention also relates to a delivery system that reduces and/or prevents the incidence of weeds.

Three "Current Trade Supported Methods" for applying granular fertilizer around a plant currently in use include the following: 1) measuring a proper amount of fertilizer based upon a plant's size and type and then spreading loose fertilizer granules on the top surface of the ground/container around a plant; 2) measuring a proper amount of fertilizer based upon a plant's size and type and then mixing loose fertilizer granules with a plant's back-fill soil; and 3) measuring a proper amount of fertilizer based upon a plant's size and type and then spreading loose fertilizer granules at the base of the hole in the ground or container where a plant is to be placed.

Other methods of applying fertilizers to a plant's root system include the following: 4) placing a pre-measured package containing fertilizer on the top surface of the ground around a plant (see U.S. Pat. Nos. 4,627,191, 3,857,195, 1,554,865, and 3,005,287); 5) pushing into the ground a fertilizer stick (see U.S. Pat. No. 4,014,675; 6) placing a pre-measured fertilizer tablet in the ground around the plant (see U.S. Pat. No. 4,055,974); 7) placing a plastic sheet incorporating a water-soluble plant nutrient on the surface of the ground (see Pat. No. 3,384,993); 8) placing a plant activating device under a plant (see Pat. No. 1,988,307); and 9) pouring a water-soluble liquid fertilizer around the base of the plant.

A disadvantage of several of the foregoing methods is that they require significant involvement of the user in determining and applying fertilizer dosage. In addition to the risk associated with measurement errors, there is also a risk the user will spread the fertilizer granules unevenly around the plant, in the back-fill soil, or at the bottom of a hole. In each of these methods there is also a risk of applying too much or too little plant nutrients (timed-release fertilizer). Even if the correct quantity of fertilizer is applied, then there is a risk of applying it unevenly. Other disadvantages emanate from the fact that a water-soluble fertilizer's nutrients are easily leached from the soil, thereby requiring frequent feeding. Also, the mixing of water and fertilizer is time-consuming, cumbersome, messy, and potentially hazardous.

A disadvantage of using a pre-measured package as disclosed in, for example, method 4 above, is that it is not economical. In addition, method 4's product design requires a pre-measured fertilizer package to be placed on the top surface of the ground and not next to the plant's root system. Also, the use of timed-release plant nutrients in a packet type of container would result in a concentration of fertilizer in contrast to a preferred design whereby the granular fertilizer is evenly spaced and evenly available to all the plant's root system.

Disadvantages of using a fertilizer stick (as identified in method 5 above) include that it provides nutrients only at the point it is inserted into the soil. Depending upon the size of the plant to be fertilized, multiple fertilizer sticks are recommended, with such sticks to be positioned equally spaced around the plant. Due to its spacing, the fertilizer does not reach all of the plant's root system equally. Also, due to the limited time fertilizer is made available to the plant's root system, usually 60 days, additional sticks must be inserted into the ground on a somewhat regular and frequent basis.

The disadvantages of using a pre-measured fertilizer tablet (as identified in method 6 above) are similar to the disadvantages of using a fertilizer stick. The availability of nutrients to the plant's root system is limited to roots closest to the fertilizer tablet; proper feeding requires multiple tablets to be used; and due to the fertilizer tablet's design, multiple feedings are necessary approximately every 60 days.

A plastic sheet incorporating a water-soluble plant nutrient on the surface of the ground (as identified in method 7 above), if wrapped around the plant's root system, would cause the plant to die. In addition, time-released fertilizers could not be incorporated into the plastic sheet due to the thickness of the plastic film, the extrusion process, and the average diameter of the timed-release fertilizer granules.

Timed-release fertilizers were first developed and/or introduced around 1985. Since then the fertilizer and nursery industries have provided timed-release fertilizer in granular form, each grain containing plant nutrients necessary for feeding a plant's root system. Methods 1, 2 and 3 above, when using timed-release fertilizers to feed a plant's root system, have been the methods recommended by the trade and in most common use by the consumer.

There are three primary disadvantages in using the existing "Trade Supported Methods" for applying timed-release fertilizers to a plant's root system. One disadvantage is that the consumer must measure the amount of fertilizer needed and, in doing so, there is a risk that the consumer will measure incorrectly and apply or distribute too much or too little fertilizer. When this happens, a plant's root system is either burned by too much fertilizer or stunted by too little fertilizer. A second disadvantage is that the consumer always distributes the granular fertilizer by hand. This method results in an uneven and poorly spaced distribution of granular fertilizer, thereby overfeeding some of a plant's roots while underfeeding others. A third disadvantage in using one of the existing methods is that a plant's root system does not have timed-release fertilizer granules placed in direct proximity to all of a plant's root system. The result is that very few roots of a plant have immediate nutrient access because of the distance between the fertilizer granule and the roots of the plant.

SUMMARY OF THE INVENTION

An object of the present invention is to provide an improved system for delivering pre-measured horticultural agents to plants; to provide such a system which allows for even distribution of the agents on the outside surface of a carrier to be placed in contact with or in close proximity to plants' root systems; to provide such a system constructed from a dissolvable and biodegradable carrier; to provide such a system which is adapted to be wrapped around a plant's root system at the time the plant is being placed in the ground or in a container; to provide such a system which reduces problems associated with providing too much or too little fertilizer or other agent; to provide such a system applicable to grass sod at the time of harvest and/or replanting; to provide such a system which works over an extended period of time, such as over months of feeding; to provide such a system which optionally incorporates a weed barrier medium of the type normally placed on the surface of the ground before the plant is placed in the ground; and to provide such a system in the form of a pot applicable for placing in the ground when planting trees, bushes and the like.

Briefly, therefore, the invention is directed to a delivery system for delivering a horticultural agent to a plant. The system has a carrier adapted to be placed in proximity to a root system of a plant, the carrier comprising a material which is biodegradable and dissolvable upon prolonged exposure to water. A horticultural agent is adhered to the carrier and is dissolvable upon prolonged exposure to water. An adhesive compound adhering the horticultural agent to the carrier is dissolvable upon prolonged exposure to water.

The invention is also directed to a delivery system for delivering a horticultural agent to a plant. The system has a carrier comprising a material which is biodegradable and dissolvable upon prolonged exposure to water, the carrier having a horticultural agent in intimate admixture therewith, which horticultural agent is dissolvable upon prolonged exposure to water.

Other objects and features of the invention will be in part apparent and in part pointed out hereinafter.

BRIEF DESCRIPTION OF THE FIGURES

FIG. 1 is a schematic top view of one embodiment of the invention.

FIG. 2 is a schematic elevation of the embodiment of the invention of FIG. 1.

FIG. 3 is a schematic plan view of one embodiment of the carrier material of the invention.

FIG. 4 is a schematic perspective view of a second embodiment of the invention.

DETAILED DESCRIPTION OF THE INVENTION

Figure 5:
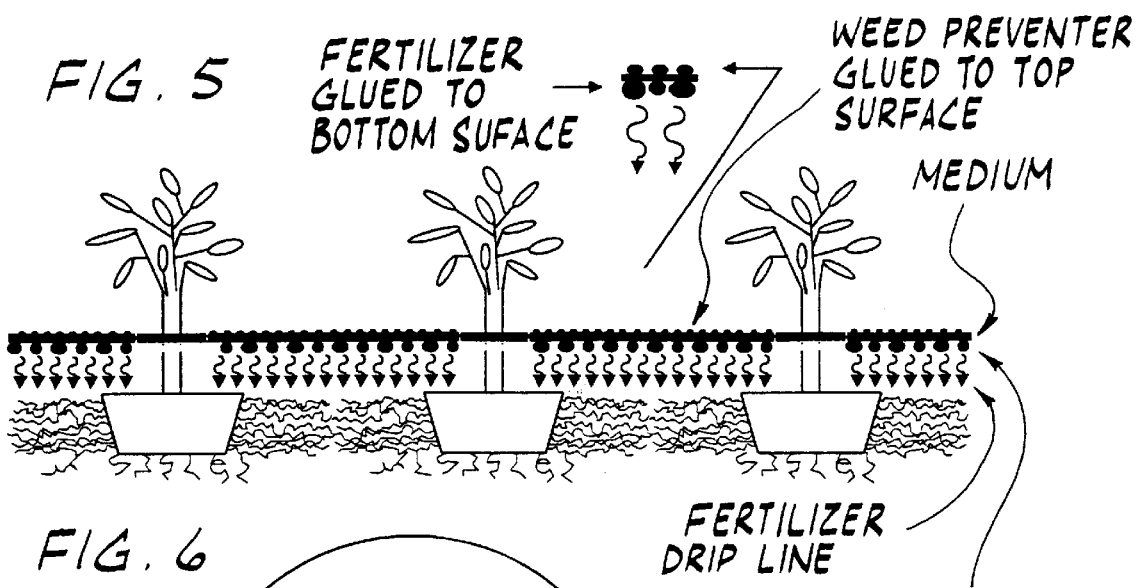
FIG. 5 is a schematic elevation of the embodiment of the invention of FIG. 4.

A first embodiment of the invention shown schematically in FIGS. 1 and 2 is a pot for growing a plant. The pot serves as a carrier for horticultural agent. The pot is constructed from a dissolvable and biodegradable medium. A horticultural agent is preferably adhered to the carrier by means of a dissolvable adhesive compound as described in more detail below. Alternatively, the horticultural agent is contained within the carrier in intimate admixture with the medium from which the carrier is constructed. The horticultural agent is in one aspect a fertilizer component that efficiently promotes steady and long term growth of a plant. Another horticultural agent optionally used is an insecticide. The pot is placed inside a hole in the ground at a depth which takes advantage of the pot's design, formulation and distribution of the fertilizer. The fertilizer contained in carrier is preferably formulated and distributed to encourage immediate and long term root growth, and is optionally formulated to match specific plant needs and soil requirements.

In the specific application shown in FIG. 2, a portion of the pot extends above ground and is designed to be folded both away from and toward the plant. The horticultural agent in the section of the pot to be folded contains a long term fertilizer and/or weed preventer (herbicide).

One embodiment of the pot is of solid construction, while a second embodiment is of the perforated construction shown schematically in FIG. 3. A third embodiment has perforated portions, such as partially perforated sides and bottom, to facilitate passage of water therethrough.

The horticultural agent is mixed with the carrier and therefore integral to the pot construction, or is optionally affixed to the surface of the carrier with a water soluble adhesive compound as represented in FIG. 2. The medium from which the pot is constructed is dissolvable and preferably recyclable, and includes, but is not limited to, paper, cardboard, certain plastics, peat, mulch, straw, burlap, and other materials.

This embodiment of the invention is optionally prepared using two different types of horticultural agent applied to different zones of the pot. The zone marked generally at A is applied with a long-term root stimulator and/or a timed-release fertilizer. The zone marked generally at B is applied with a delay fertilizer or a timed-release fertilizer. This provides for efficient delivery of a root stimulator from the area of the pot (A) in closest proximity to the roots, and for efficient delivery of a timed-release fertilizer from the area of the pot (B) comprising the lip extension represented in FIG. 2. Similar application of differing zones of horticultural agent apply to the other embodiments of the invention described below.

Use of this embodiment of the invention typically involves placing a newly acquired potted plant, e.g., removed from a conventional pot, into the pot of the invention. At first this concept of placing either a potted plant or a non-potted plant into another plant pot immediately prior to planting the plant seems redundant, unnecessary, and wasteful. However, the pot's design provides a method of incorporating a fertilizer and/or root stimulator readily into the planting system.

This fertilizer pot overcomes the various disadvantages of current methods of fertilization of potted type plants and trees. For example, this invention provides direct application of fertilizer efficiently completely around the root system, as contrasted with inefficient application of granular fertilizer to the ground surface or at the bottom of a hole before planting. Because this invention applies fertilizer to fixed locations under the ground, the risk of poisoning housepets and the like is eliminated. An accurate amount of fertilizer is effectively distributed completely around the root system, while with granular fertilizers some channeling of water flow can cause uneven delivery and much wasted effectiveness.

As compared to liquid fertilizer methods, this invention overcomes the problems of fertilizer quickly leaching from the plant's root access.

The above-described pot of the invention is suitable for plants resulting from nursery and home started seedlings, nursery and home plants such as four- and six-pack vegetable and flower trays, small potted plants, bushes, trees and the like.

In a second embodiment of the invention shown in FIGS. 4 and 5, the carrier is a sheet for delivery of a horticultural agent to plants or the like. The sheet is constructed from a material whose composition is dissolvable and biodegradable and is selected from the same materials as the pot described above. The sheet contains a slowly dissolving horticultural agent such as a fertilizer, insecticide or herbicide. The sheet is designed to be placed flat on the ground prior to planting one plant or multiple plants. The sheet is of solid and/or perforated design whose horticultural agent is either mixed with the sheet material and/or glued to the top or bottom surface thereof. Furthermore, the distribution of the horticultural agent is optionally intentionally varied across the sheet so as to encourage immediate and long term root growth of new plantings. The sheet optionally includes weed preventer (herbicide) applied to the upper surface of the carrier as shown in FIG. 5, which retards or prevents weeds or other undesirable growth from occurring.

The sheet is optionally constructed from a perforated material as shown in FIG. 3. The sheet is optionally designed for delivery of agents for insect control and plant disease control as well as for fertilization. Fertilizer incorporated into the sheet is optionally formulated to match specific plant needs and soil requirements.

The sheet of the invention overcomes many of the problems associated with granular and liquid fertilizers discussed above. Furthermore, the embodiment of the sheet which includes horticultural agent adhered to the upper or lower surface of the sheet is especially adaptable to selective distribution of the agent to desired locations on the sheet, rather than evenly over the entire sheet.

The sheet of the invention is adapted for use in most home and business landscaping applications, with nursery and home plants, including four- and six-pack vegetable and flower trays, one to ten gallon potted plants, and ball and burlap plants. Furthermore, the sheet material is optionally an open weave medium, which results in potentially reduced material requirements and which encourages migration of roots into back-fill soil.

In a further embodiment of the invention the carrier is a physical weed barrier (such as a perforated or open weave sheet), which is constructed from a polyethylene or like material, with horticultural agent adhered thereto by an adhesive compound. This embodiment is distinct from the other embodiments herein in that the carrier is not readily dissolvable, as it is intended to remain in tact for a relatively long time on the ground, and prevent the growth of weeds, while releasing a fertilizer or other horticultural agent to the ground. A herbicide is optionally applied to the top surface of the carrier.

In a variation of the dissolvable sheet form of the invention, it is adapted to be wrapped around a plant's root system prior to planting. This variation provides advantages of delivery of horticultural agent directly to a plant's root system similar to the pot form of the invention described above. The flexible nature of the sheet allows it to conform to the shape of the root ball such that it intimately contacts the root ball and delivers nutrients and other desired agents thereto. The wrap also serves to contain the root ball during the planting operation, and eventually degrades allowing the root ball to meld with the soil.

Figure 12:
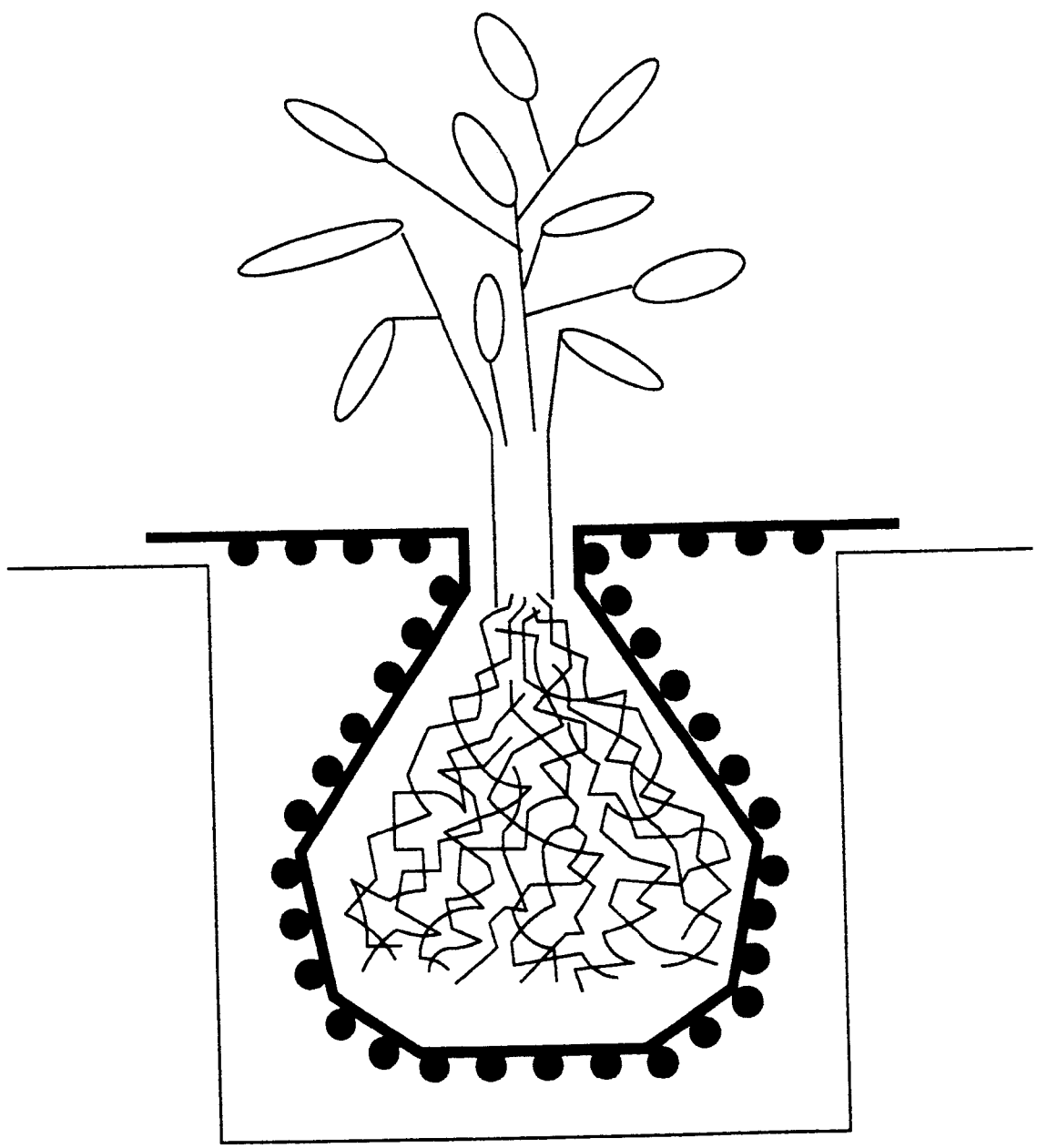
FIG. 12 is a schematic view of an alternative embodiment of the invention.

In another variation of the sheet form of the invention, the sheet is designed to in part be wrapped around the plant's root system to be placed in the ground, while part of the sheet is laid on top of the ground extending around the plant. Advantageously, a weed inhibitor and fertilizer are optionally incorporated into the section of the sheet extending on the ground, while fertilizer and root stimulator are incorporated into the section of the sheet wrapped around the root ball. Several functions, including securement of the root ball during planting, direct and intimate immediate and long-term root fertilization, long-term fertilization from the sheet section extended on the ground, and weed prevention, are all achieved with one simple to use product, as shown in FIG. 12.

Figure 6:
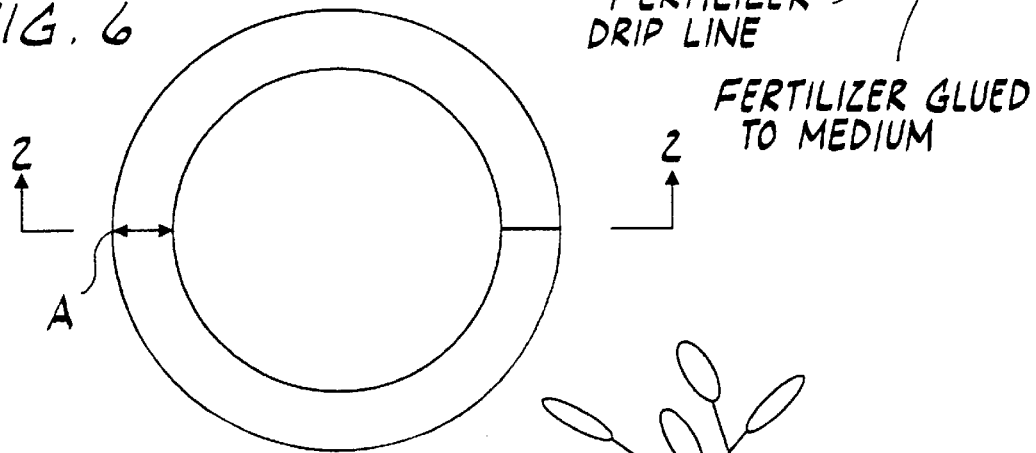
FIG. 6 is a schematic top view of a third embodiment of the invention.
Figure 7:
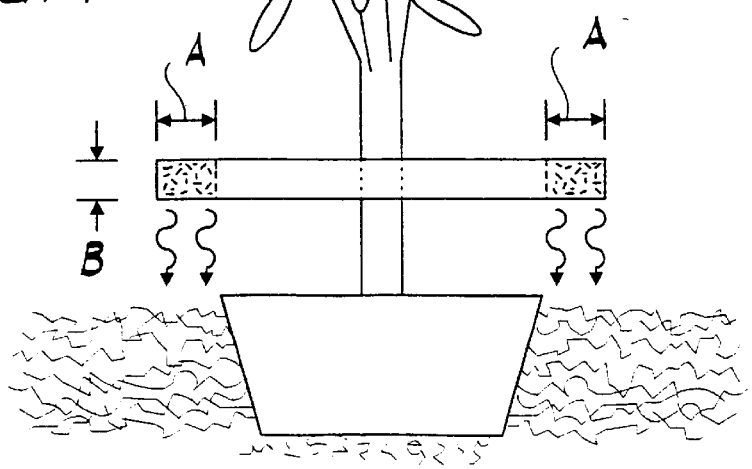
FIG. 7 is a schematic elevation of the embodiment of the invention of FIG. 6.

A further embodiment of the invention is conceptually the same as the sheet in terms of construction, application, and advantages, but the carrier is in the form a disk, or ring as shown schematically in FIGS. 6 and 7. This embodiment also includes a variation in which the carrier has a smaller cross section in the form of a rope-type shape. This embodiment is adapted to be placed at appropriate locations, including on the ground and underground, for delivery of horticultural agent to plants, trees, sod and the like. The ring or rope has a preferred circular or square shape proportional to the size of the plant's root growth zone, and is adapted to be placed flat on the ground after the plant is planted such that the plant is centered in the ring or rope.

In a further option applicable to all of the above embodiments, a horticultural agent in liquid form is admixed with the adhesive compound, with or without an additional, e.g., granular horticultural agent adhered to the carrier.

In manufacturing the sheet form of the invention, the horticultural agent can be applied to the sheet by broadcast spreading. In particular, after formation of the sheet, the sheet is sprayed or coated with a water soluble glue or other appropriate adhesive compound. While the glue or adhesive is wet, the sheet is passed under a spray or curtain of horticultural agent comprising regular and/or timed-release fertilizer, herbicide, and/or insecticide. The horticultural agent falls onto the wet glue or adhesive. A top layer of the sheet or other biodegradable and dissolvable carrier is optionally applied to cause the horticultural agent to be sandwiched between the top and bottom layers of biodegradable and dissolvable material. The more preferred embodiment does not include this second layer of material.

After application of horticultural agent to the sheet, the sheet is air-dried or passed through a drying oven, depending on the requirements of the materials used. The sheet can then be cut and optionally rolled up. The sheet can optionally be printed with desired indicia, such as product information.

Figure 8:
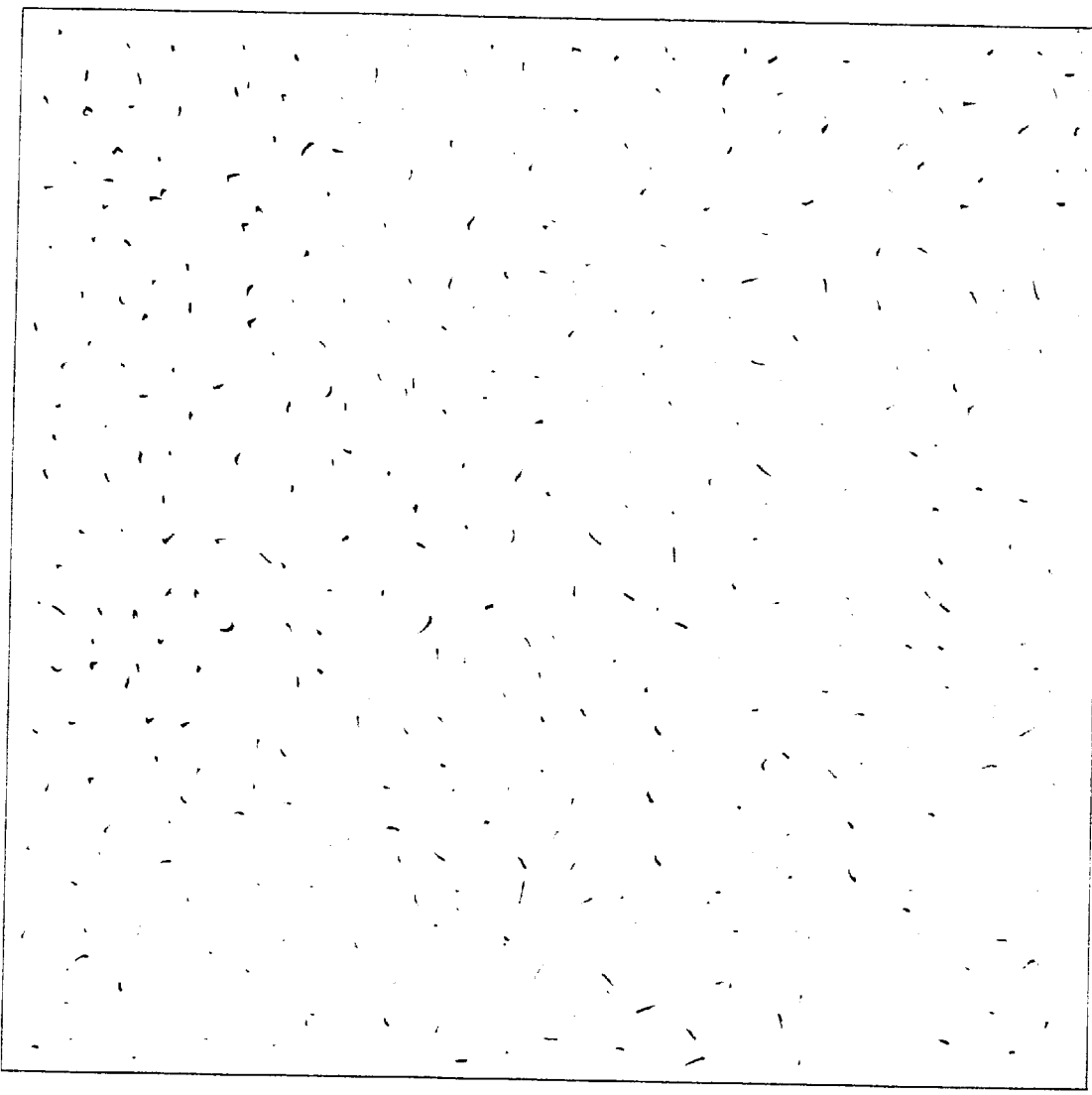
FIG. 8 is a schematic view illustrating distribution of horticultural agent on the carrier in one embodiment of the invention.
Figure 9:
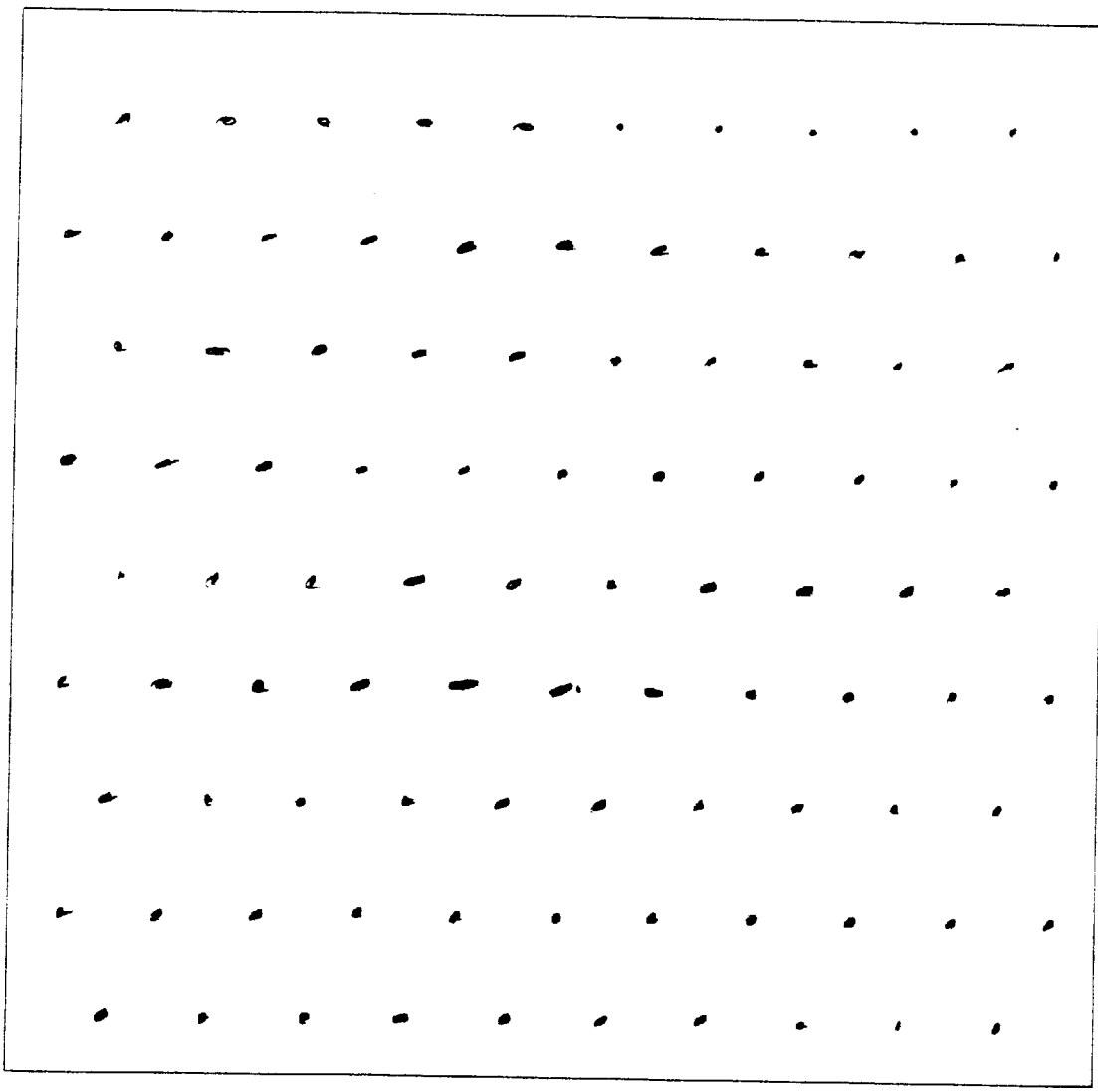
FIG. 9 is a schematic view illustrating an alternative distribution of horticultural agent on the carrier of the invention.
Figure 10:
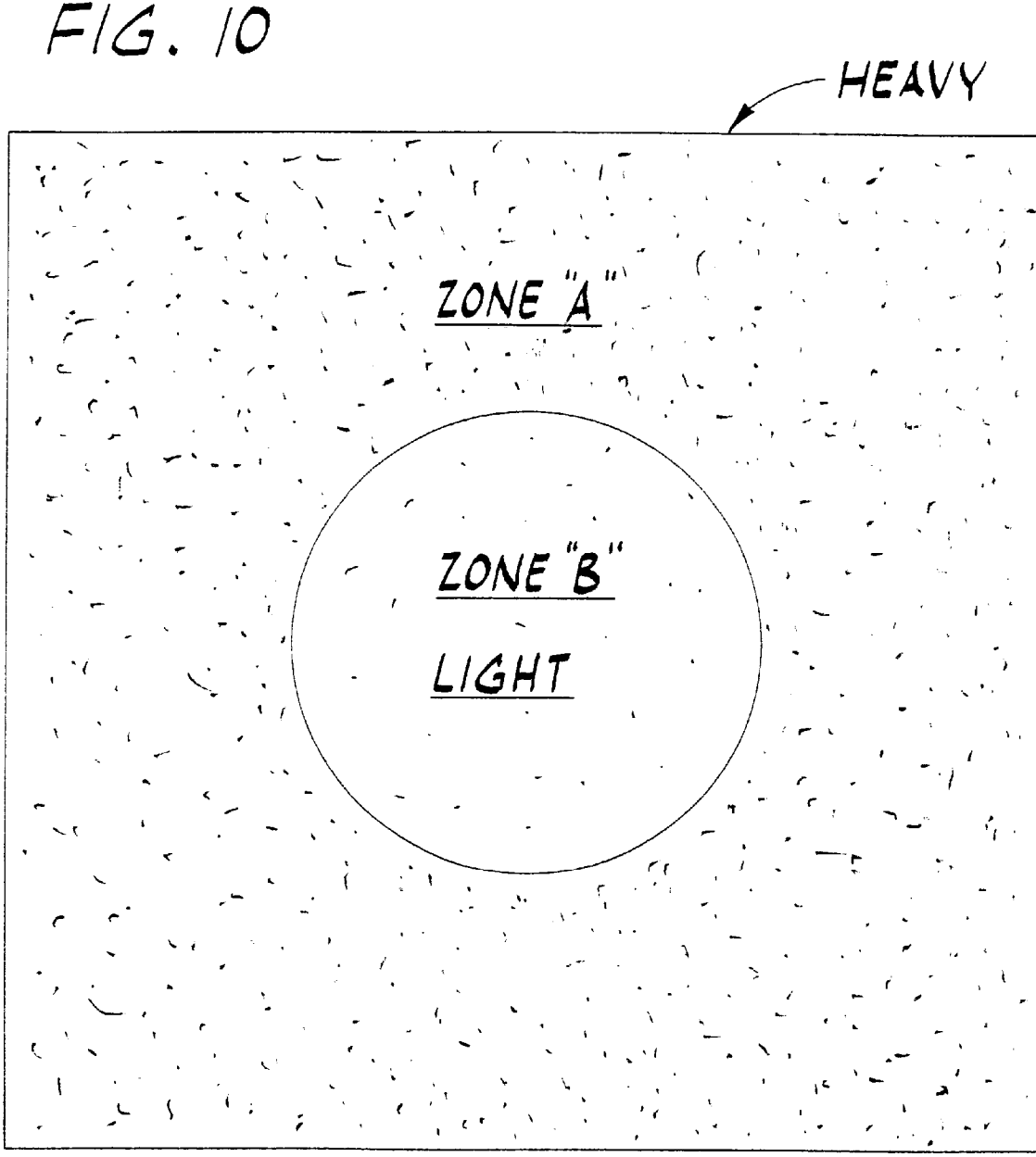
FIG. 10 is a schematic view illustrating an alternative distribution of horticultural agent on the carrier of the invention.

In the foregoing manufacturing process, the horticultural agent is optionally controlled with respect to spacing between granules of horticultural agent. This regulation or control ensures even spacing of the horticultural agent. In a variation of this controlled distribution, one manufacturing option is to distribute pre-measured timed-release fertilizer or other horticultural agent by zone to create zones of heavy concentration and zones of light concentration. In particular, the horticultural agent is applied in random fashion as illustrated in FIG. 8, in a more even predetermined pattern as shown in FIG. 9, or in a zonetype pattern as shown in FIG. 10. The pattern shown in FIG. 10 is advantageous where it is desirable to deliver different agents or different concentrations of agents to different locations.

Figure 11:
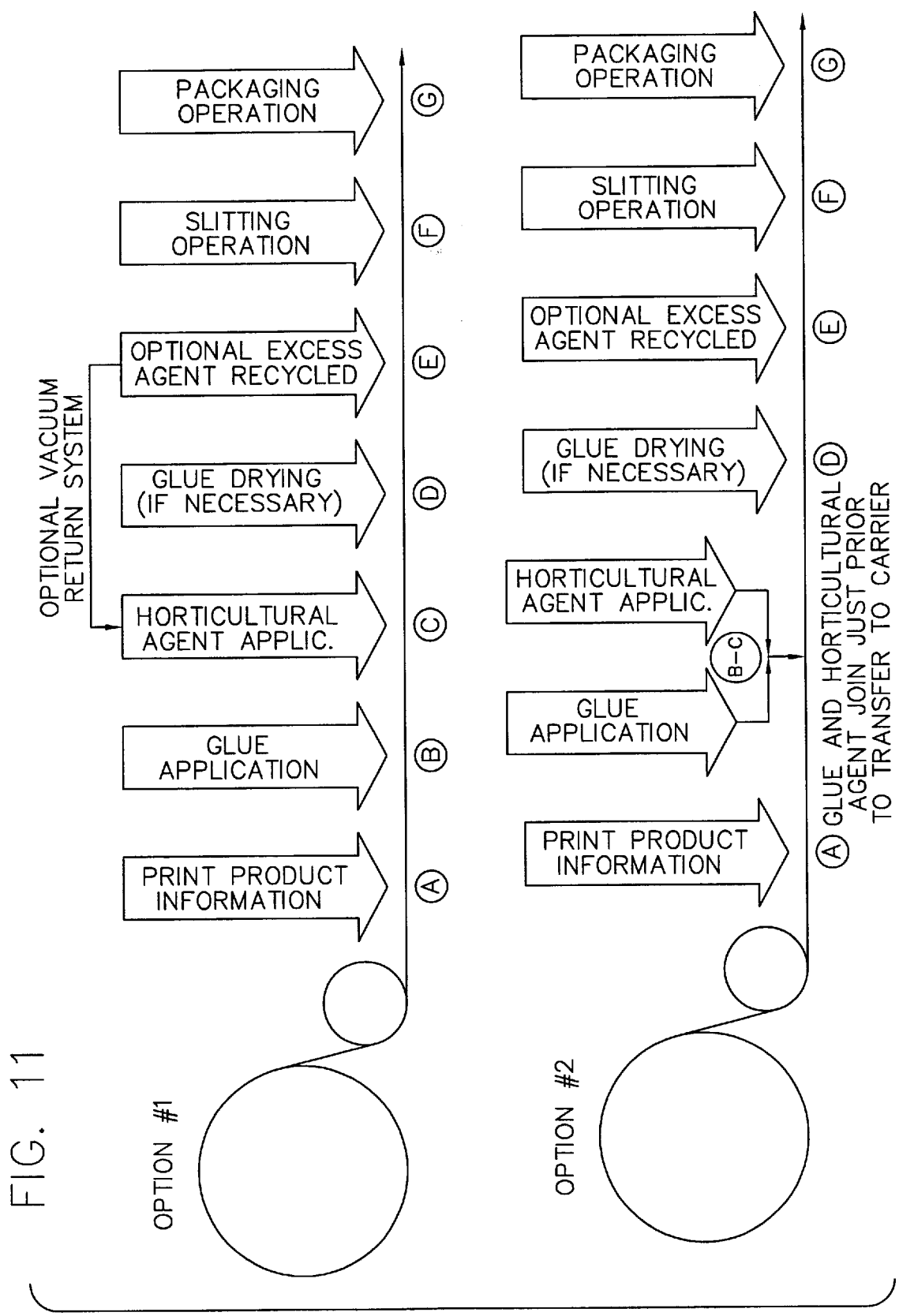
FIG. 11 is a diagram illustrating steps in manufacturing the invention.

The manufacturing operations for the sheet form are summarized in FIG. 11. The carrier is fed from a roll or other source to an optional printing operation where product information is printed on the sheet. In a subsequent operation, adhesive compound is applied, and in a subsequent operation, horticultural agent is applied. Preferred agents include timed-release granular fertilizers distributed by Pursell Industries under the trade name "Polyon" and such fertilizers distributed by The Scotts Company under the trade name "Osmocote." A drying operation, where required, is also performed, followed by optional reapplication of horticultural agent. The sheet is then cut to provide the desired characteristics of shape and optionally holes through which plants are to ultimately planted. Finally, the sheet is packaged by rolling, stacking, or the like, as desired.

As various changes could be made in the above embodiments without departing from the scope of the invention, it is intended that all matter contained in the above description shall be interpreted as illustrative and not in a limiting sense.

What is claimed is:

1. A delivery system for delivering a horticultural agent to a plant, the system comprising:
   a carrier adapted to be placed in proximity to a root system of a plant and to be positioned to surround at least a portion of the plant, the carrier comprising a material which is biodegradable and dissolvable upon prolonged exposure to water;
   a horticultural agent which is adhered to the carrier and which is dissolvable upon prolonged exposure to water; and
   an adhesive compound adhering the horticultural agent to the carrier, which adhesive compound is dissolvable upon prolonged exposure to water.

2. The delivery system of claim 1 wherein the carrier is a pot having a bottom having interior and exterior surfaces, side walls having interior and exterior surfaces, and an open top adapted to receive the root system of the plant and adapted for placement in a ground hole.

3. The delivery system of claim 2 wherein the horticultural agent is distributed on the interior surfaces of the bottom and side walls.

4. The delivery system of claim 2 wherein the horticultural agent is distributed on the exterior surfaces of the bottom and side walls.

5. The delivery system of claim 2 wherein the horticultural agent is distributed on the interior and exterior surfaces of the bottom and side walls.

6. The delivery system of claim 2 wherein the pot comprises an upper lip and a lip extension at the upper lip of the pot adapted to extend generally parallel to the ground surface upon placement of the pot with root system therein into the ground hole, the lip extension having an upper surface facing away from the ground and a lower surface facing toward the ground upon placement of the pot with root system therein into the ground hole.

7. The delivery system of claim 6 wherein the horticultural agent is distributed on the upper surface of the lip extension.

8. The delivery system of claim 6 wherein the horticultural agent is distributed on the lower surface of the lip extension.

9. The delivery system of claim 6 wherein the horticultural agent is distributed on the upper and lower surfaces of the lip extension.

10. The delivery system of claim 1 wherein the carrier is a flexible sheet having an upper surface and a lower surface and adapted to be wrapped around the root system prior to planting of the plant such that the upper surface of the sheet faces toward the root system and the lower surface of the sheet faces away from the root system.

11. The delivery system of claim 10 wherein the horticultural agent is distributed on the upper surface of the sheet.

12. The delivery system of claim 10 wherein the horticultural agent is distributed on the lower surface of the sheet.

13. The delivery system of claim 10 wherein the horticultural agent is distributed on the upper and lower surfaces of the sheet.

14. The delivery system of claim 1 wherein the carrier is a flexible sheet having an upper surface and a lower surface and adapted to be disposed on ground above the root system of the plant such that the upper surface of the sheet faces upwardly away from the ground and the lower surface faces downwardly toward the root system.

15. The delivery system of claim 14 wherein the horticultural agent is distributed on the upper surface of the sheet.

16. The delivery system of claim 14 wherein the horticultural agent is distributed on the lower surface of the sheet.

17. The delivery system of claim 16 wherein a herbicide is adhered to the upper surface of the sheet.

18. The delivery system of claim 14 wherein a horticultural agent is adhered to the upper and lower surfaces of the sheet.

19. The delivery system of claim 1 wherein the carrier has a flexible, elongate, rope-type shape adapted to be placed proximate the root system.

20. The delivery system of claim 1 wherein the carrier is in the form of a disk adapted to be placed around the plant proximate the root system, the disk having an upper surface which faces upwardly away from the ground and a lower surface which faces downwardly toward the root system when the disk is disposed around the plant, and no covering being provided over the horticultural agent.

21. The delivery system of claim 20 wherein the horticultural agent is distributed on the upper surface of the disk.

22. The delivery system of claim 21 wherein a herbicide is adhered to the upper surface of the disk.

23. The delivery system of claim 20 wherein the horticultural agent is distributed on the lower surface of the disk.

24. The delivery system of claim 20 wherein the horticultural agent is distributed on the upper and lower surfaces of the disk.

25. The delivery system of claim 1 wherein the horticultural agent is distributed randomly on the carrier.

26. The delivery system of claim 1 wherein the horticultural agent is distributed in a predetermined pattern on the carrier.

27. The delivery system of claim 26 wherein the carrier has a first zone on which horticultural agent is distributed in a first density and a second zone on which horticultural agent is distributed in a second density, the first density characterized by a denser distribution of horticultural agent than the second density.

28. The delivery system of claim 1 wherein the carrier comprises a material selected from the group consisting of paper, cardboard, biodegradable plastic, peat, mulch, straw, and burlap.

29. The delivery system of claim 1 wherein the horticultural agent is timed-release fertilizer.

30. The delivery system of claim 1 comprising a sealing layer of material on top of the horticultural agent to seal the horticultural agent between carrier and the sealing layer, the sealing layer comprising a material which is dissolvable upon prolonged exposure to water.

31. A delivery system as set forth in claim 1 wherein the carrier is a physical weed barrier.

32. A delivery system for delivering a horticultural agent to a plant, the system comprising:
   a carrier comprising a material which is biodegradable and dissolvable upon prolonged exposure to water, the carrier having a horticultural agent in intimate admixture therewith, which horticultural agent is dissolvable upon prolonged exposure to water,
   the carrier being a pot having a bottom having interior and exterior surfaces, side walls having interior and exterior surfaces, and an open top adapted to receive the root system of the plant and adapted for placement in a ground hole.

33. The delivery system of claim 32 wherein the pot comprises an upper lip and a lip extension at the upper lip of the pot adapted to extend generally parallel to the ground surface upon placement of the pot with root system therein into the ground hole, the lip extension having an upper surface facing away from the ground and a lower surface facing toward the ground upon placement of the pot with root system therein into the ground hole.

34. A delivery system for delivering a timed-release fertilizer to a root system of a plant, the system comprising:

a carrier placed in proximity to the root system of the plant, the carrier being constructed from a paper material which is biodegradable and dissolvable upon prolonged exposure to water, the carrier being a flexible sheet having an upper surface and a lower surface and wrapped around the root system prior to planting of the plant such that the upper surface of the sheet faces toward the root system and the lower surface of the sheet faces away from the root system;

a timed-release fertilizer which is adhered to the carrier and which is dissolvable upon prolonged exposure to water; and an adhesive compound adhering the horticultural agent to the carrier, which adhesive compound is dissolvable upon prolonged exposure to water.

35. A method of delivering a horticultural agent to a root system of a plant using a carrier comprising a material which is biodegradable and dissolvable upon prolonged exposure to water, the carrier including a horticultural agent dissolvable upon prolonged exposure to water, the method comprising:

wrapping the carrier around a root system of the plant, and planting the plant.

36. A method of delivering a horticultural agent to a root system of a plant using a carrier comprising a material which is biodegradable and dissolvable upon prolonged exposure to water, the carrier including a horticultural agent dissolvable upon prolonged exposure to water, the method comprising:

placing the carrier on the ground to surround a stem of the plant allowing the horticultural agent to dissolve to evenly feed the root system.

37. A method of delivering a horticultural agent to a root system of a plant using a carrier comprising a material which is biodegradable and dissolvable upon prolonged exposure to water, the carrier including a horticultural agent dissolvable upon prolonged exposure to water, the carrier being shaped as a pot for retaining a root system, the method comprising:

placing the plant in the pot, planting the pot and plant in soil.

* * * * *